XR 3,646,568
X3058D

[15] 3,646,568
[45] Feb. 29, 1972

Woywood

[54] BEAM CONTROL SYSTEM

[72] Inventor: Dennis J. Woywood, Cherry Hill, N.J.
[73] Assignee: RCA Corporation
[22] Filed: Apr. 3, 1969
[21] Appl. No.: 813,108

[52] U.S. Cl. .....346/108, 178/7.6, 350/7
[51] Int. Cl. .....G01d 15/14
[58] Field of Search .....346/108, 1; 350/7, 6; 178/6.7 R, 6.7 A, 7.6

[56] References Cited

UNITED STATES PATENTS 3,144,637 8/1964 Adams et al. .....346/108 X
3,314,074 4/1967 Becker .....346/108
3,370,504 2/1968 Buck et al. .....178/6.7 R
3,465,347 9/1969 Hudson .....346/108 X

*Primary Examiner*—Joseph W. Hartary
*Attorney*—Edward J. Norton

[57] ABSTRACT

A beam control system characterized by first and second independently controllable light beams which are alternately and separately scanned across a predetermined focal surface by first and second elements of a dual mirror scanning assembly; the dual scanning feature permitting spot position corrections to be made to the nonscanning beam during the period that the remaining beam is in its scanning mode.

3 Claims, 6 Drawing Figures

3646568
OR IN 346/108

INVENTOR
DENNIS J. WOYWOOD

BY Edward J Norton
ATTORNEY

INVENTOR
DENNIS J. WOYWOOD

BY Edward J Norton
ATTORNEY

BEAM CONTROL SYSTEM

The invention herein described was made in the course of or under a contract or subcontract thereunder with the Department of the Air Force.

This invention relates to a beam control system, and, more particularly, to a system for controlling the beam within a laser recorder and a method for recording signals.

Generally, in laser recording, input signals to be recorded are used to modulate a laser beam which is then scanned in a two-dimensional pattern on a recording medium. The recorders are generally of two types: signal recorders, which record signals on film for playback; and image recorders, which record on film for separate visual use without playback.

During playback in the signal recorder the film is scanned in the same pattern used during recording. The signal recovered from the film is converted into a time varying voltage duplicating the form of the original input to the recorder. In an image recorder the film is either examined visually, or optically processed; the film can also be rescanned in a format different from the original recording.

Both types of recorders require components for implementing the following major functions: establishment of a basic recording energy source; modulation of this energy source by the signals to be recorded, utilizing either AM or FM techniques; focusing of the modulated energy source into a high-energy density recording spot; and scanning of a recording medium by this recording spot.

Generally, the recording film is scanned both by moving the recording spot across the film via a rotating mirror assembly, and by transporting the film past the scanning station. The introduction of scanning errors may occur either during recording or during playback.

The basic sources of recording format errors are generally due to one or more of the following: manufacturing and/or mounting inaccuracies associated with the scanning mirror; changes in optical alignment; scanning servo errors; transport servo errors; and film guidance errors. Playback errors are generally attributable to changes in film size; skewing of the recorded tracks; scanning component inaccuracies and film guidance.

Accordingly, it is an object of the present invention to provide a beam control system primarily for use within a laser recorder, and to provide a method for recording signals, which results in a uniform standard format recording, even with nonideal scanning components.

A beam control system for use within a laser recorder, in accordance with the present invention, comprises: means supplying first and second beams of laser light, said beams modulated by the signal to be recorded; first and second optical systems adapted to transmit said first and second modulated beams, imaging means disposed to receive the transmitted beams from said first and second optical systems, said imaging means adapted to focus the transmitted beams into high-energy density recording spots; and, a dual mirror scanner assembly disposed to receive said high-energy density recording spots, said assembly characterized by two mirrored polygons mounted upon a common shaft which rotates to cause said recording spots to alternately scan a predetermined focal surface.

A method for recording electrical signals, in accordance with the present invention, comprises the steps of: providing first and second beams of light modulated by the signals to be record; focusing said first and second beams of light into first and second high-energy density recording spots; and, alternately scanning said recording medium with said first and second recording spots.

For purposes of illustration the present invention will be described in conjunction with the operation of a laser beam signal recorder; however, except where so specified, its general application should not be construed as being so limited.

The present invention, as well as additional objects and advantages thereof, will be best understood upon reading the following description in conjunction with the accompanying drawings wherein.

In addition to the implementation of the major functions mentioned supra, laser recorders require additional optical components, electronics and control systems to aid in the playback of the recorded signals. The relationship of components within a laser recorder, for recording and reproducing signals, is shown in FIG. 1.

Figures 1, 2:
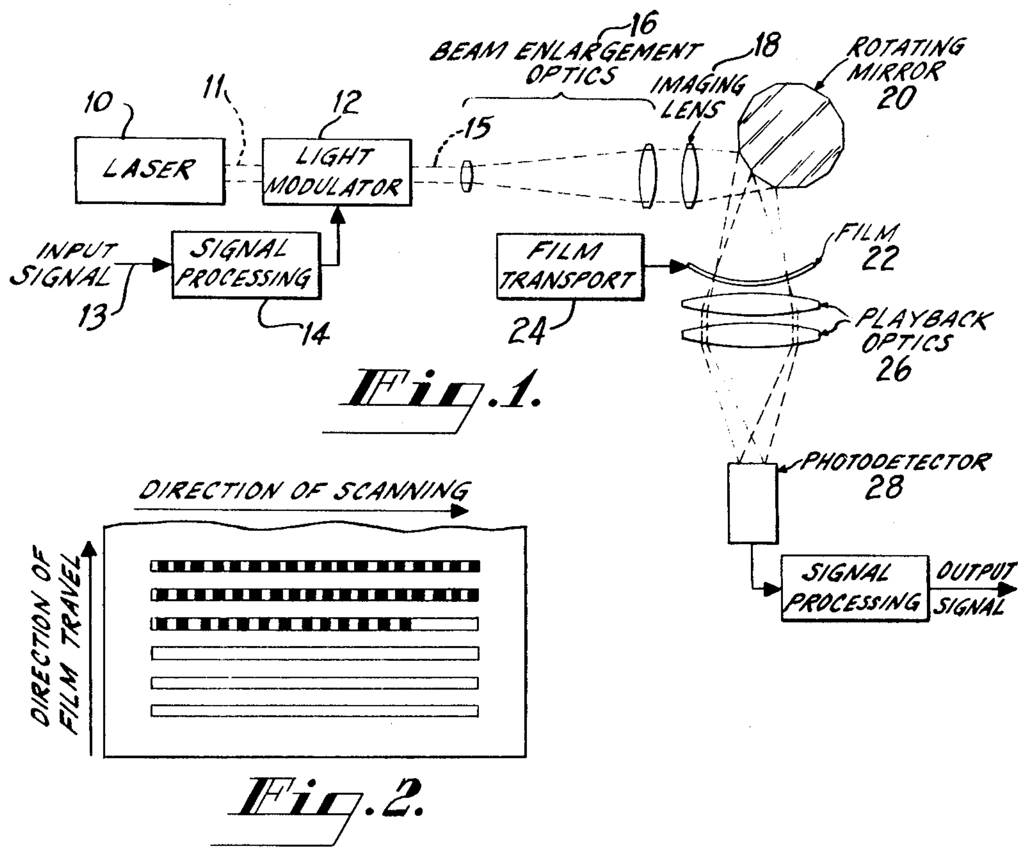
FIG. 1 is illustrative of the basic components which comprise a laser beam recorder.
FIG. 2 is illustrative of a recording medium as derived from laser recorders which embody the present invention.

As shown in FIG. 1, the laser 10 provides a coherent light beam 11 of high intensity which is directed into a light modulator 12. The modulator 12 is simultaneously provided with input signals 13 to be recorded, via a signal processor 14. The input signals cause the modulator 12 to intensity modulate the laser light 11 in relation to the characteristics of the input signals. The modulated light 15 is then focused into a high-energy density recording spot by the beam enlargement optics 16 and imaging lens 18, and then reflected by an appropriately disposed scanning mechanism 20, onto the recording medium 22 which is advanced by a transport 24; the scanning mechanism normally taking the form of a rotating mirror 20, and the recording medium generally being a chemically processable film 22.

To reproduce the recorded signals, the recording medium 22, is replaced in the equipment used for recording and again scanned with the laser beam 10. With the modulator 12 deactivated, a constant intensity beam will be intensity modulated by the varying film density along a recording track on the film 22. The laser energy transmitted by the film 22 is collected by the playback optics 26 which directs the energy to a photodetector 28. The photodetector 28 converts the intensity modulation of the laser beam into an electrical signal, which is the desired laser reproducer output. The recorded film format is represented in FIG. 2. This format is similar to the magnetic tape format which is characteristic of rotary head, transverse scan, magnetic tape recorders. The significant distinctions between the typical magnetic tape and the laser recorded film are the dimensions of the recorded tracks and the writing rates used for recording. Recorded track widths in commercial video tape recording system are typically in the order of 125 micrometers, while those used in laser wide-bandwidth signal recorders are usually less than 25 micrometers. Wavelengths of the recorded signals are of similar dimensions in both magnetic and laser signal recorders.

Bandwidth capabilities of a signal recorder are thus strongly influenced by the relative scanning velocity which can be achieved by the scanning mechanism. Scanning velocity relates the recorded signal wavelength to the frequency of the signal being recorded. Thus, the conversion factor from the time domain to the space domain is scanning velocity. A laser recorder can achieve a scanning velocity which is 10 times that achievable with magnetic recorders. This feature, in conjunction with the available energy to record at these higher rates and the capability for wide-bandwidth modulation of this energy, enables more than a 10-times increase in signal recording bandwidths over those available from the most advanced magnetic signal recorders.

Figure 3:
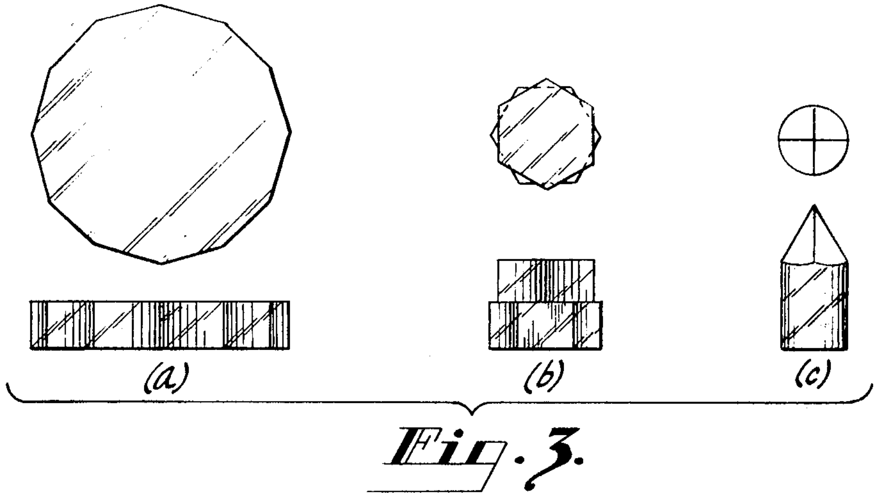
FIG. 3 represents rotatable mirror assemblies usable within laser beam recorders.

Three types of mechanical scanning mirrors are shown in FIG. 3: polygonal mirrors (a); pyramidal mirrors (c); and a combination of polygonal mirrors (b). The common characteristic of these three types of scanners is that they provide high resolution. The pyramidal mirror (c) has advantages in that the resolution and scanning velocity is substantially constant across the scan. A polygonal mirror, on the other hand, has a slight variation in scanning velocity across a scan which can range from a few percent to 20 percent in scanning velocity depending upon the specific design. A variation in spot size of about the same amount can be expected over the scan with a polygonal mirror. One advantage that a polygonal mirror has over the pyramidal mirror is that for a given scanning velocity the polygonal mirror face velocity need by considerably slower than that of an equivalent pyramidal mirror.

Some of the advantages of a single rotating polygonal mirror can be overcome by the use of a dual polygonal mirror system. In addition, since a single mirror of a dual mirror scanner is not used over its full scan capability, recording is alternately shared by two mirrors.

Figures 4, 5, 6:
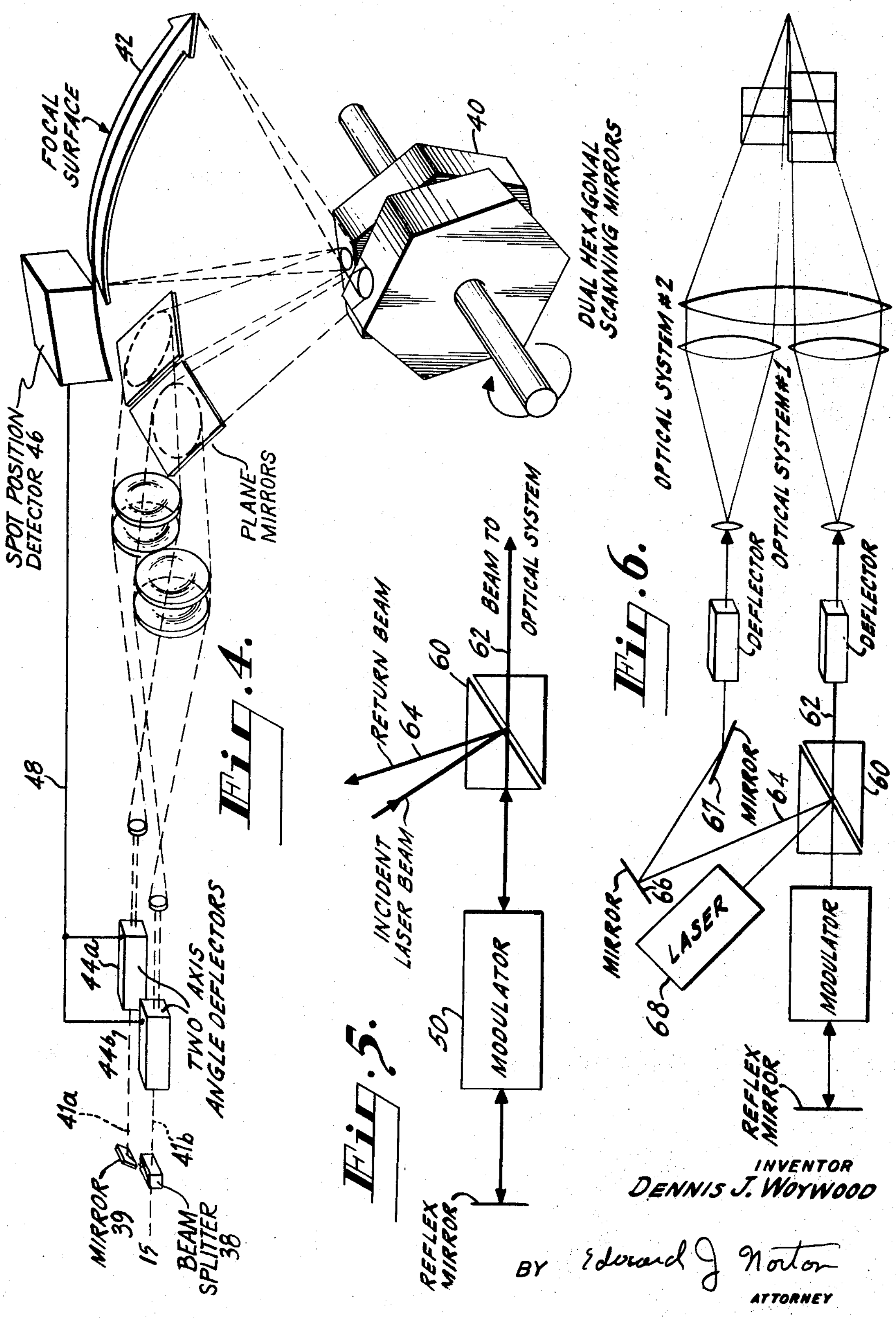
FIGS. 4, 5, and 6 are illustrative of embodiments which incorporate the present invention.

FIG. 4 illustrates the use of a dual polygonal scanning system in accordance with the present invention. The dual hexagonal mirror system 40 shown in FIG. 4 can be shown to be the equivalent of a single 12-sided mirror in terms of scan rates. In addition, the dual hexagonal mirrors can be built more readily and to more accurate tolerances than a 12-sided mirror. However, an important feature of the dual polygonal scanning system shown in FIG. 4, is that two independently controlled beams can be made simultaneously available over a relatively long period of time.

To establish the dual beam system shown in FIG. 4 the modulated laser beam 15 emanating from the modulator (not shown) is split into first 41*a* and second 41*b* components via a beam splitter 38. One component 41*a* is deflected via a mirror 39 for transmission to a first optical system; the remaining component 41*b* passes through the beam splitter 38 and is transmitted to a second optical system. Each of the aforementioned optical systems is characterized by beam enlargement optics and an imaging lens, as shown in FIG. 1, for forming the component beams into first and second high-energy density recording spots. The recording spots thus formed are then transmitted to the dual polygonal scanning assembly 40 the individual mirrors of which alternately scans them across a predetermined focal surface 42. This provides an allowance of sufficient time between scans of the individual beams by the individual mirrors to permit beam correction via separate two axes beam deflectors 44*a*, 44*b* which are shown in FIG. 4 disposed intermediate the beam splitter-mirror (38,39) assembly and the optical systems. If a common optical system and a common deflector were to be used, beam correction would have to occur in zero time thereby necessitating a deflector capable of exhibiting infinite bandwidth characteristics.

As shown in FIG. 4, the system used a mirror assembly 40 having two mirrored polygons mount upon a common shaft, which rotate together to produce continuous scanning by a focused laser beam across the focal surface 42. The two polygons are oriented with respect to each other such that alternate scans are produced by each of the separate polygons. Therefore, while the beam transmitted by one mirror is actively scanning the film, the beam transmitted by the adjacent mirror is preparing to enter the film in the recording area. It is available for essentially one-half of a scan period prior to being used for active recording. Accordingly, before the beam enters the firm area there is a finite time available to position it accurately.

With the dual mirror scanning assembly of the present invention alternate scans originate from completely separate optical systems each controlled by a separate deflector 44*a*, 44*b*. Thus, changes to one scan can be made without affecting the position of the preceding or following scan. By designing the system such that each mirror scans a line which is twice the active scan line length on the film, a minimum correction time equal to one-fourth of the active scan time is available.

In the beam control system of FIG. 4, the position of the recording/reproducing spot may be detected adjacent to the recording film prior to each scan via an appropriately disposed spot position detector 46. Any deviation of the spot from its correct position is detectable in two axes; i.e., its position is detected both in the direction of scanning and the direction of film motion. While the detector 46 may take different forms, one approach can include a suitable arrangement of photoelectric pickup devices responsive to the recording/reproducing spots in space and time. When detected, deviations from the correct position can be made to generate error signals which can then be fed back via appropriate means 48 and used to drive the beam deflectors 44*a*, 44*b* to adjust the spot position. Examples of deflectors which may be used include piezoelectric deflectors; electrooptic deflectors; magnetostrictive electromagnetic drives.

Shifts in spot position due to mirror-manufacturing tolerances will be fixed offsets occurring at the scan rate and, for any given mirror, such mirror face offsets will be repeatable thereby permitting correction in a preprogrammed fashion. Deviation in spot position due to mechanical alignment shifts will generally vary slowly with time. In such cases closed-loop correction of shifts are desirable.

Because alternate scans are handled by individual optical systems, the dual optical scanning system described supra results in a two to one reduction in optical efficiency resulting in only half of the energy being available per scan. FIG. 6 is illustrative of a further embodiment of the present invention which overcomes this loss in optical efficiency.

The embodiment illustrated by FIG. 6 makes use of a Glan-Foucalt air spaced prism, operated in the reflex mode. The modified Glan-Foucalt prism 60 is used to simultaneously perform the functions of an input beam polarizer, an output beam polarization analyzer and an input-output beam separator for the light beams applied to and obtained from a reflex electrooptic modulator. The basic operation of a Glan air spaced prism to enable reflex operation of a light modulator and convert polarization modulation into intensity modulation is depicted in FIG. 5. Basically, the prism 60 is a single means which, in cooperative relationship with the electrooptic modulator 50 operating in its reflex mode, simultaneously performs the respective functions of properly polarizing the input light beam to the modulator; spatially separating the coincident, oppositely traveling input and output beams respectively applied to and obtained from the modulator; and converting the elliptically polarized modulated output beam from the modulator into an intensity modulated output beam. Normally only one component 62 of the elliptically polarized modulated output is permitted to continue on to illuminate the optical system; that component having the primary signal to be recorded impressed on it as intensity modulation. The remaining portion of the output, i.e., the return beam 64, is normally deflected back toward the laser source 68, though not over the exact path of origination. In an FM recording system this return beam need not be needlessly absorbed but can be efficiently utilized to separately illuminate a second optical system.

In the case of a quarter-wavelength bias, i.e., half-light-intensity bias, the modulation on the return beam 64 is the complement of the transmitted beam 62 directed to the optical system. Furthermore, in the case of an FM signal format both the return beam 64 and the transmitted beam 62 contain equal average power and identical modulation with the exception that the two are 180° out of phase. Therefore, by directing the return beam 64 to the second optical system via a mirror assembly 66, 67 this optical energy can be utilized.

By varying the path length over which the two beams must travel before entering the optical systems the information recorded on adjacent scan lines can be brought into phase. For example, if the propagation time for one beam is increased by one-half of the period of the FM carrier, the undeviated FM carrier would then be of identical phase on adjacent scan lines. For example, consider a 150 MHz FM carrier whose period is approximately 6.66 nanoseconds. By increasing the effective path length by 1 meter a transient time lag of 3.33 nanoseconds is accomplished.

FIG. 6 further illustrates that common lens 69 may be used to focus the beam outputs of the separate optical systems into high energy density recording spots for transmission to the scanning assembly 70 which corresponds to the dual polygonal scanning system 40 shown in FIG. 4.

What is claimed is:

1. A beam control system for a recorder, comprising:

means supplying first and second beams of light, with said beams modulated by the signals to be recorded;

first and second optical systems adapted to transmit said first and second modulated beams;

imaging means disposed to receive the transmitted beams from said first and second optical systems, said imaging means adapted to focus the transmitted beams into high-energy density recording spots;

a dual mirror scanner assembly continuously illuminated by said high-energy density recording spots, said assembly being arranged so that each of said mirrors continuously receives a respective one of said spots to cause said recording spots to alternately scan a predetermined focal surface when said assembly is rotated;

monitoring means for providing output information indicative of the position of the scanning path of the respective spots during the period a given spot is not actively scanning said predetermined focal surface; and beam deflection means responsive to the output of said monitoring means to adjust the scanned path position of the respective recording spots prior to said given spot scanning said predetermined focal surface.

2. The invention according to claim 1, wherein said first and second light beams comprise first and second laser light beams, and said dual mirror scanner assembly includes a pair of coaxially mounted mirrored polygons.

3. The invention according to claim 1, wherein said means supplying first and second beams of light with said beams modulated by the signals to be recorded comprises, a reflex electrooptic modulator for delaying one of a pair of input quadrature components of light of a given wavelength with respect to the other by an amount which depends upon the instantaneous value of an applied time-angle modulated modulating signal whereby the delayed pair of light components constitutes the output of said modulator, a Glan-Foucalt prism having a predetermined orientation with respect to said modulator and with respect to a beam of plane polarized light of a given wavelength applied thereto for illuminating said modulator with said pair of input quadrature components, said predetermined orientation resulting in said prism being illuminated by said modulator output and dividing said output into two spatially separated 180° out-of-phase time-angle modulated light beams of substantially equal average power which constitutes respectively said first and second modulated beams; and wherein said first optical system has a first optical path length, and said second optical system has a second optical path length which differs from said first path length by substantially an odd number of half-periods of the center frequency of said time-angle modulated modulating signal.

* * * * *